United States Patent [19]

Bryan-Brown et al.

[11] Patent Number: 5,917,570
[45] Date of Patent: Jun. 29, 1999

[54] LIQUID CRYSTAL DEVICE ALIGNMENT

[75] Inventors: Guy Peter Bryan-Brown; Carl Vernon Brown; Damien Gerard McDonnell, all of Malvern, United Kingdom

[73] Assignee: The Secretary of State for Defence in Her Britannic Majesty's Government of the United Kingdom of Great Britain and Northern Ireland, Hants, United Kingdom

[21] Appl. No.: 08/875,940

[22] PCT Filed: Jan. 22, 1996

[86] PCT No.: PCT/GB96/00107

§ 371 Date: Aug. 8, 1997

§ 102(e) Date: Aug. 8, 1997

[87] PCT Pub. No.: WO96/24880

PCT Pub. Date: Aug. 15, 1996

[30] Foreign Application Priority Data

Feb. 10, 1995 [GB] United Kingdom ................ 9502635.7

[51] Int. Cl.⁶ .................................................. G02F 1/1337
[52] U.S. Cl. .......................... 349/129; 349/124; 349/128; 349/134; 349/136
[58] Field of Search ...................... 349/123, 129, 349/133, 124, 134, 136, 132, 128, 172, 175, 177, 178; 428/1

[56] References Cited

U.S. PATENT DOCUMENTS

| | | | |
|---|---|---|---|
| 3,787,110 | 1/1974 | Berreman et al. | 349/123 |
| 4,521,080 | 6/1985 | Funada et al. | 349/129 |
| 5,438,421 | 8/1995 | Suggwara et al. | 349/123 |
| 5,486,403 | 1/1996 | Ishitaka et al. | 349/123 |
| 5,725,915 | 3/1998 | Ishitaka et al. | 349/123 |
| 5,754,264 | 5/1998 | Bryan-Brown et al. | 349/123 |
| 5,796,459 | 8/1998 | Bryan-Brown et al. | 349/128 |

FOREIGN PATENT DOCUMENTS 2 286 894  8/1995  United Kingdom .
WO 79/01025 11/1979  WIPO .

OTHER PUBLICATIONS

Schedule "Liquid Crystal Displays with High–Information Content", May 1989.
SID Seminar Lecture Notes—vol. II May 1989. pp. 12.2–12.18.
Patent Abstracts of Japan vol. 009, No. 195 (P–379), 13 Aug. 1985 & JP, A, 60 060624 (Matsushita Denki Sangyo KK), 8 Apr. 1985.

*Primary Examiner*—William L. Sikes
*Assistant Examiner*—Tai Van Duong
*Attorney, Agent, or Firm*—Nixon & Vanderhye P.C.

[57] ABSTRACT

A liquid crystal display cell comprises two cell walls spaced apart to enclose a layer of liquid crystal material. The cell walls carry electrode structures, e.g. arranged in rows and columns to give an x, y matrix of addressable elements or pixels. The liquid crystal material is aligned by a grating (grooved) structure on one or both cell walls. This grating structure is a bigrating with one symmetrical grating and an asymmetric grating which may be orthogonal to the symmetric grating. The grooves of the asymmetric grating varying their depth or asymmetry along the lengths to give a locally varying pretilt whose longer range average provides a pretilt in a preferred range, e.g. about 2–24 degrees.

21 Claims, 5 Drawing Sheets

SECTION AA

SECTION BB

LIQUID CRYSTAL DEVICE ALIGNMENT

BACKGROUND OF THE INVENTION

1. Field of the Invention

This invention relates to liquid crystal device alignment. Such devices typically comprise a thin layer of a liquid crystal material contained cell walls. Optically transparent electrode structures on the walls allow an electric field to be applied across the layer causing a re-ordering of the liquid crystal molecules to an ON state. On removing the electric field the molecules relax back to their OFF state.

2. Discussion of Prior Art

There are three known types of liquid crystal material, nematic, cholesteric, and smectic each having a different molecular ordering.

The present invention particularly concerns devices using nematic, long pitch cholesteric or ferroelectric materials, and a surface alignment treatment to the cell walls. This surface alignment aligns liquid crystal molecules in contact with the wall in an alignment direction. By arranging these alignment directions orthogonal the liquid crystal is forced to adopt a twisted structure in its voltage OFF state. This device is known as a twisted nematic device. Addition of a small amount of cholesteric material to the nematic material imparts a preferred twist direction to ensure a uniform twist in the device. Also devices can be made with angles of twist greater than 90°; eg the super twisted nematic device, or 270° twisted nematic device described in U.S. Pat No. 4,596,446. Another requirement for the alignment treatment is that it should also impart a surface tilt to liquid crystal molecules at the cell wall. Such a surface tilt is necessary in some devices to ensure a uniform display as described eg in GB-1,472,247, and 1,478,592.

One method of providing alignment is termed a rubbing process where a cell wall, with or without a polymer layer, is unidirectionally rubbed by a soft cloth. Liquid crystal molecules align along the rubbing direction, usually with a surface tilt of about 2° or more depending upon the polymer layer.

Another alignment technique is known as oblique evaporation of eg SiO, which can produce surface tilts of zero, or high tilt eg 30° depending upon evaporation direction angle. Such a technique is cumbersome for large scale manufacture; but a more important problem is that it is difficult to provide a uniform alignment direction and surface tilt over large areas of cell walls.

Short pitch cholesteric materials forming thermochromic displays have been aligned by grating structures embossed into plastic cell walls; this is described in GB 2143323 (McDonnell, 1983). A previous use of gratings to obtain pretilted alignment has utilised a blazed grating crossed with a sinusoidal grating (U.S. Pat. No. 4,521,080, Funada et al, 1985, Lee et al SID 93 Digest p. 957, Japan-A-60 060 624, and GB 2 286 894).

The liquid crystal director then runs along the sinusoidal grooves and hence over the blazed grooves which leads to surface pretilt. Pretilted alignment is essential for liquid crystal devices to avoid reverse tilt disclinations which can lead to poor device quality. One disadvantage of this prior art is that it only provides a limited range of pretilts.

SUMMARY OF THE INVENTION

This problem is overcome according to the present invention by varying the profile of a groove along its length whereby the pretilt can be arranged to have selected values.

According to this invention a liquid crystal device comprises:

two cell walls spaced apart and enclosing a layer of a liquid crystal material;

electrode structures on both cell walls;

a surface alignment on the cell walls providing alignment of the liquid crystal material;

CHARACTERISED BY at least one cell wall provided with a bigrating that provides surface alignment with pretilt;

the bigrating comprising an asymmetric modulated grating and a symmetric modulated grating arranged at a non-zero angle to one another with the two gratings having different groove depth or pitch values and the asymmetric grating having an asymmetry that varies along its length to provide alignment and surface pretilt to the liquid crystal material.

The two gratings may be substantially orthogonal to one another, or at other non-zero angles, eg 40 to 50°, or 80 to 100°.

The asymmetric grating may have a smaller groove depth and/or a longer pitch than the symmetric grating.

The gratings may be arranged across substantially the whole of a display area of the cell or may be arranged at display pixel areas only. Further, the shape of the two gratings at each pixel may vary within each pixel area, or between adjacent pixels. The directions of the gratings may vary with each pixel area or between adjacent pixels.

The gratings may be applied to both cell walls and may be the same or different shape on each wall.

One or both cell walls may be coated with a surface surfactant over the whole or part of the wall.

The walls may be substantially rigid, eg glass material, or flexible eg polyolefin.

The gratings may be formed of a photoresist material, or of a plastics material formed by embossing of eg polyolefin. The embossed material may also provide small pillars (eg or 1–3 $\mu$m height and 5–50 $\mu$m or more width) for assisting in correct spacing apart of the cell walls and also for a barrier to liquid crystal material flow when a cell is flexed. Alternatively the pillars may be formed by the material of the gratings.

The liquid crystal material may be a nematic, a long pitch cholesteric material with either positive or negative dielectric anisotropy, or a ferroelectric material. A long pitch cholesteric material has a typical pitch of a few microns or more. Typical layer thickness is about 4–7 $\mu$m for a nematic or long pitch cholesteric, and 1–3 $\mu$m for a ferroelectric material.

The electrodes may be formed as a series of row and column electrodes arranged in an x, y matrix of addressable elements or display pixels. Typically the electrodes are 200 $\mu$m wide spaced 20 $\mu$m apart.

Alternately, the electrodes may be arranged in other display formats, eg r-$\theta$ matrix, or 7 or 8-bar displays.

According to another aspect of this invention a method of providing a surface alignment and surface molecular tilt on the surface of a liquid crystal device cell wall comprises the steps of:

forming a layer of a photo resist material on the surface of a liquid crystal cell wall, exposing the resist material to light through a mask formed of a plurality of discrete opaque areas whereby some areas of the resist receive a symmetric exposure and other areas receive an asymmetric exposure, developing the resist layer to selectively remove resist, baking the remaining resist, the arrangement being such that two gratings are formed, one having a symmetric shape and the other an asymmetric shape, with the asymmetry varying across the surface of the cell wall.

BRIEF DESCRIPTION OF THE DRAWINGS

The invention will now be described, by way of example only, with reference to the accompanying drawings of which.

DETAILED DESCRIPTION OF PREFERRED EMBODIMENTS

Figure 1:
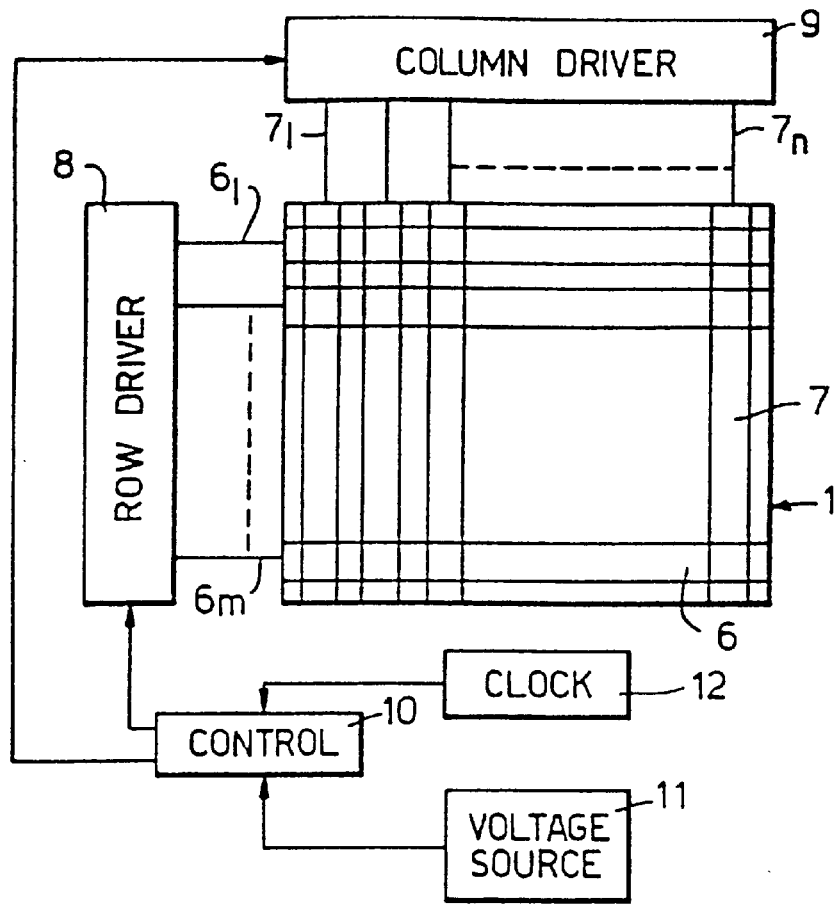
FIG. 1 is a plan view of a matrix multiplex addressed liquid crystal display.
Figure 2:
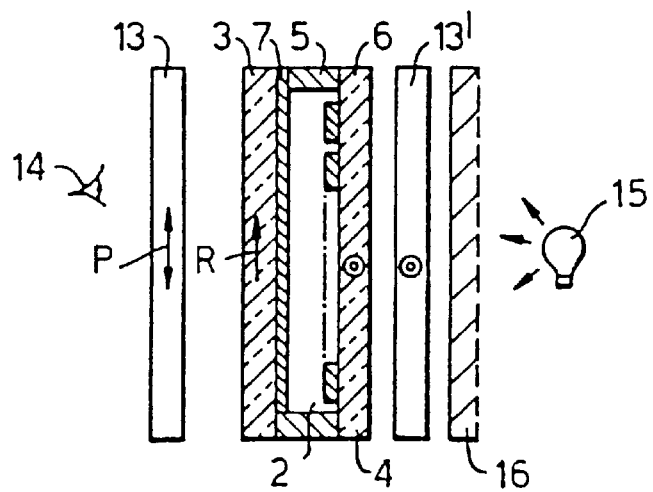
FIG. 2 is a cross section of the display of FIG. 1.

The display of FIGS. 1, 2 comprises a liquid crystal cell 1 formed by a layer 2 of nematic or long pitch cholesteric liquid crystal material contained between glass walls 3, 4. A spacer ring 5 maintains the walls typically 6 um apart. Additionally numerous 6 um diameter glass beads may be dispersed in the liquid crystal material to maintain an accurate wall spacing. Strip like row electrodes 6 eg of $SnO_2$ or ITO are formed on one wall 3 and similar column electrodes 7 formed on the other wall 4. With m-row and n-column electrodes this forms an m.n matrix of addressable elements or pixels. Each pixel is formed by the intersection of a row and column electrode.

A row driver 8 supplies voltage to each row electrode 6. Similarly a column driver 9 supplies voltages to each column electrode 7. Control of applied voltages is from a control logic 10 which receives power from a voltage source 11 and timing from a clock 12.

Either side of the cell 1 are polarisers 13, 13' arranged with their polarisation axis crossed with respect to one another and parallel to an alignment direction on the adjacent wall 3, 4 as described later.

A partly reflecting mirror 16 may be arranged behind the cell 1 together with a light source 15. These allow the display to be seen in reflection and lit from behind in dull ambient lighting. For a transmission device, the mirror may be omitted.

Prior to assembly the cell walls 3, 4 are surface alignment treated with bigratings as described later to provide a desired surface pretilt. For example a cell having about a 270° twist may have a pretilt of about 5–15°.

Suitable liquid crystal materials are E7 (nematic), ZLI2293 (nematic), along or mixed with a cholesteric eg CB15, or SCE8x (smectic $S_c^*$) available from E. Merck.

Figure 3A:
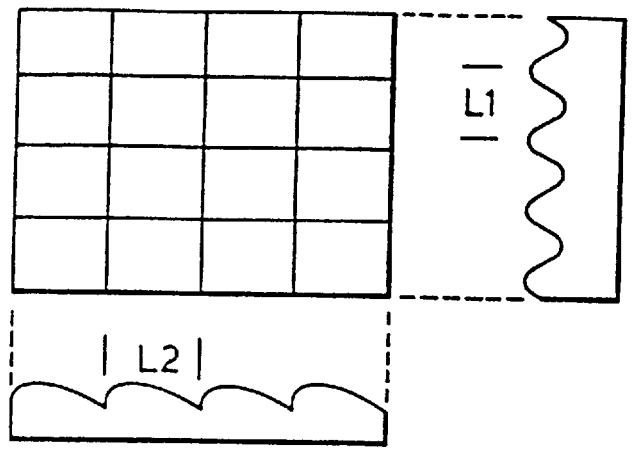
FIG. 3 is a diagrammatic view of a prior art bigrating.
Figure 4A:
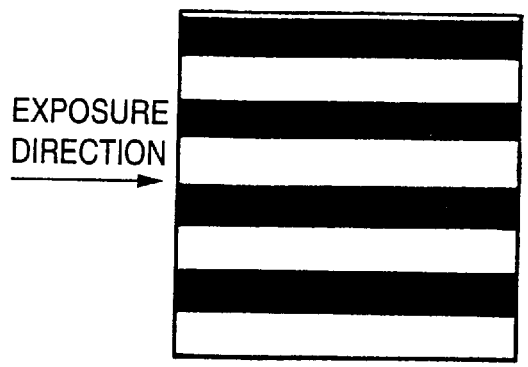
FIGS. 4a, b show details of a mask and exposures to produce the bigrating of FIG. 3.
Figure 4A:
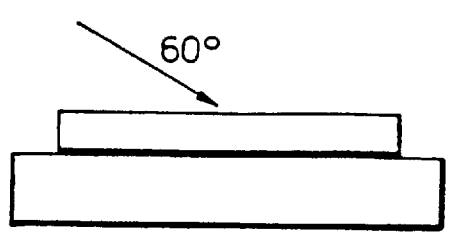
Figure 4B:
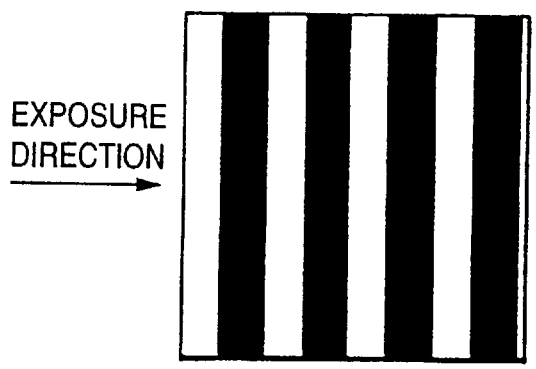
Figure 4B:
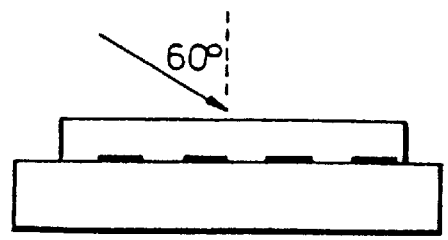

FIG. 3 shows the configuration described in the prior art which contains a substantially symmetric modulation of pitch $L_1$ crossed with a substantially asymmetric modulation of pitch $L_2$. The liquid crystal aligns parallel to the grooves of the symmetric grooves and the pretilt is induced by the asymmetric grooves. It can be shown, as described below, that the range of pretilts obtained from this structure is limited to two narrow ranges which excludes a desired range. The experimental method relies on off-axis photolithography but could instead use interferography or embossing.

A piece of ITO coated glass to form the cell wall was cleaned with acetone and isopropanol and was then spin coated with photoresist (Shipley 1813) at 3000 rpm for 30 seconds giving a coating thickness of 1.5 $\mu$m. Softbaking was then carried out at 90° C. for 30 minutes.

Two contact exposures were then carried out using a chrome mask containing 0.5 $\mu$m lines and 0.5 $\mu$m gaps (hence an overall pitch of 1 $\mu$m) as shown in FIG. 4. For the first exposure the grating mask was oriented so that the grooves were in the plane of the off-axis exposure at 60° to the normal, FIG. 4a. This exposure geometry illuminates the photoresist with a symmetric intensity distribution (and hence a symmetric grating as in FIG. 3). The mask in then released from the substrate rotated by 90° and re-clamped so that the groove direction is substantially perpendicular to the plane of incidence as shown in FIG. 4b. Exposure in this geometry leads to an intensity distribution in the photoresist which is asymmetric and provides an asymmetric grating shown in FIG. 3 (see for example B. J. Lin, J. Opt. Soc. Am., 62, 976 (1972)).

With this double exposure method it is only essential that the second exposure is carried out at a non-zero angle of incidence. Furthermore this angle does not have to be 60°. Typical exposure times were found to be 120 s for the first exposure ($t_1$) and 107 s for the second exposure ($t_2$) at an incident intensity of 0.8 mW/cm$^2$ from a mercury lamp. (For all samples $t_1 > t_2$ to ensure that alignment occurred in the desired direction). After the two exposures the sample was then developed for 10 seconds in Shipley MF319 and rinsed in de ionised water. This left a bigrating in the surface of the resist in which a symmetric modulation was crossed with an asymmetric modulation. A hardbake was then carried out at 105° C. for 10 hours to ensure insolubility of the photoresist in the liquid crystal. Each substrate was found to give pretilted alignment in which the director was in the plane of incidence of the second, asymmetric exposure and pretilted towards the incidence direction. Thus a pretilted alignment has been formed using bigratings, the configuration described in the prior art.

These substrates were then constructed to make 10 $\mu$m thick pretilt cells and were filled with nematic liquid crystal (E7, Merck). Pretilts were then measured using the crystal rotation method or the magnetic null method (T. J. Scheffer and J. Nehring, J. Appl. Phys., 48, 5, 1783 (1977)). For samples with $t_1$=120 s and $t_2$=107 s (see earlier definitions), pretilts in the range 25.0°–32.0° were measured. When the exposure times were reduced to $t_1$=90 s and $t_2$=80 s, pretilts in the range 1.5°–2.4° were measured. Subsequent adjustment of the exposure times failed to produce a pretilt in the regime of 2.4°–23.1°.

The present invention aims to provide pretilts in this 2.4°–23.1° range.

Figure 5A:
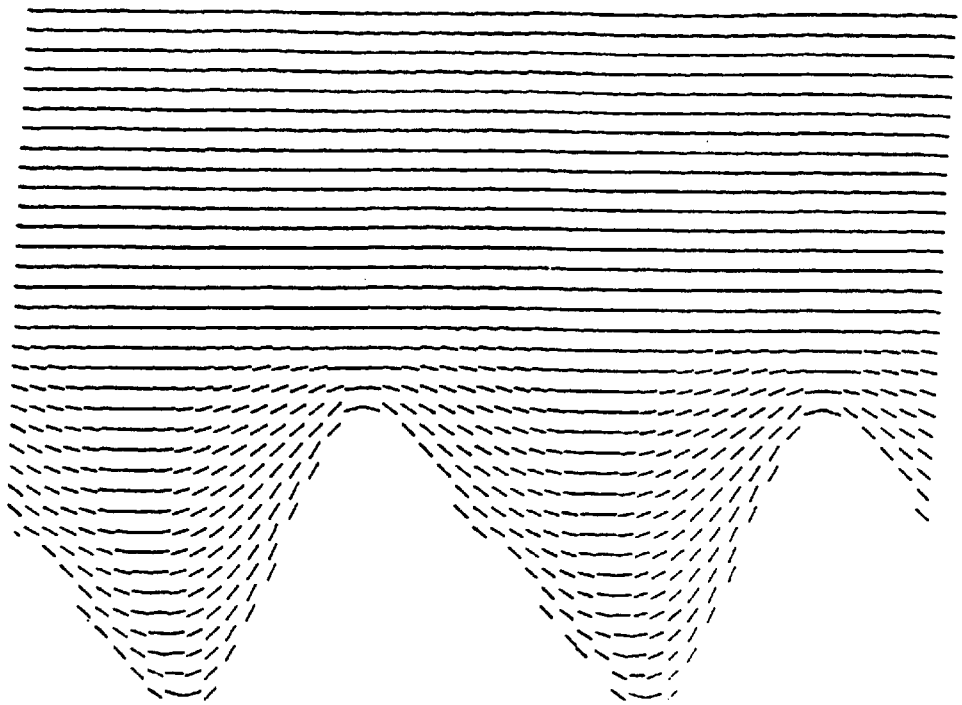
FIGS. 5a, b are cross section of liquid crystal material at different gratings showing local changes of liquid crystal director.

Liquid crystal director configurations over blazed grooves is shown in FIGS. 5a,b. This shows that two distinct regimes exist.

Figure 5B:
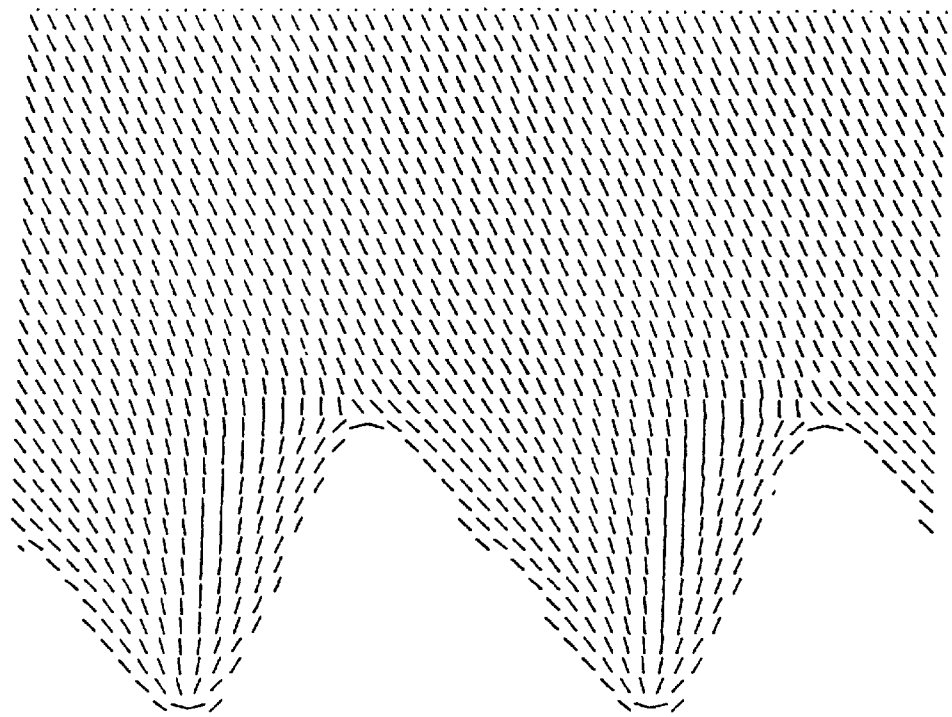

For lower grooves depth or groove asymmetry, the director deformations over the grooves are predominantly bend deformations as shown in FIG. 5a. If the groove depth or asymmetry is increased then a dramatic change occurs in the configuration and the deformation now includes a large amount of splay (FIG. 5b); the former configuration will always induce a low pretilt while the latter will give a large pretilt. The exact extent of the inaccessible regime will depend on the liquid crystal material, the surface profile and the zenithal anchoring energy of the surface (which dictates the extent to which the first molecular layer can be perturbed from a tangential orientation with respect to the local surface). Thus the configuration described above and in the prior art will always have a regime of pretilt which is inaccessible.

One method for producing pretilts not obtained by the prior art is now described. This allows a better tunability of surface pretilt into regimes which are useful for TN (eg 90°), STN (eg 270°) and ferroelectric applications. The method relies on creating a structure where the profile of the asymmetric grooves varies along their length thereby leading to a locally varying pretilt. The macroscopically observed pretilt has a uniform single value which depends on the form of the variation in asymmetry. A practical embodiment of this principle is now described.

Figure 6:
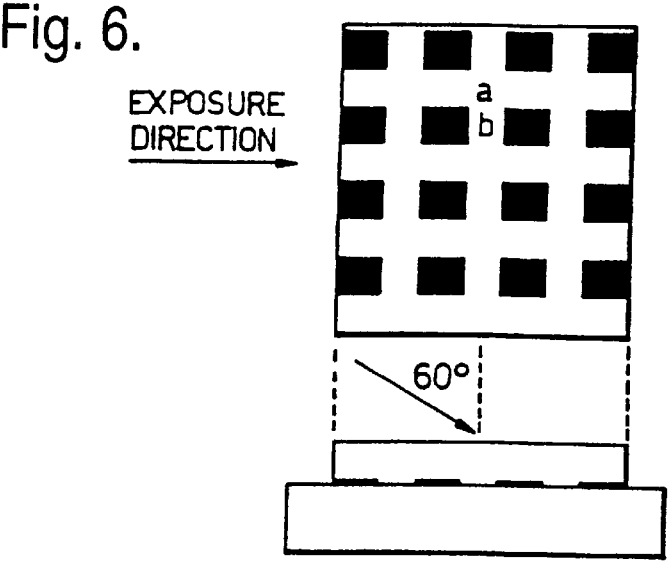
FIG. 6 shows details of a mask and exposure to produce a bigrating of the present invention.

Substrates were first coated with photoresist as described earlier and were then given a single off axis exposure using a bigrating as shown in FIG. 6. In the example given, the bigrating mask consists of chrome rectangles of dimensions 0.7×0.8 $\mu$m separated by 0.5 $\mu$m gaps in both directions. Thus the overall pitch of the surface modulations were 1.2 $\mu$m and 1.3 $\mu$m. The pitches were different to ensure that the alignment occurred in a consistent direction. One exposure at 60° was carried out for 227 seconds (0.8 mW/cm$^2$) followed by a 10 second develop in MF319 as before. Referring to FIG. 6, the surface formed from this mask induces low pretilt because the asymmetric illumination of the substrate only occurs in the regions (b) while the regions (a) receive no asymmetry in exposure.

Figure 7:
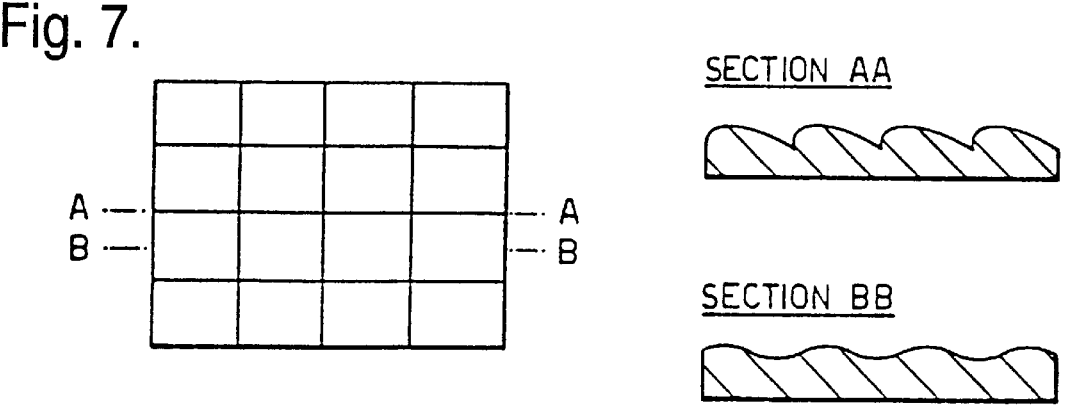
FIG. 7 is a diagrammatic view of a bigrating of the present invention showing cross section profiles at two different positions.
Figure 8:
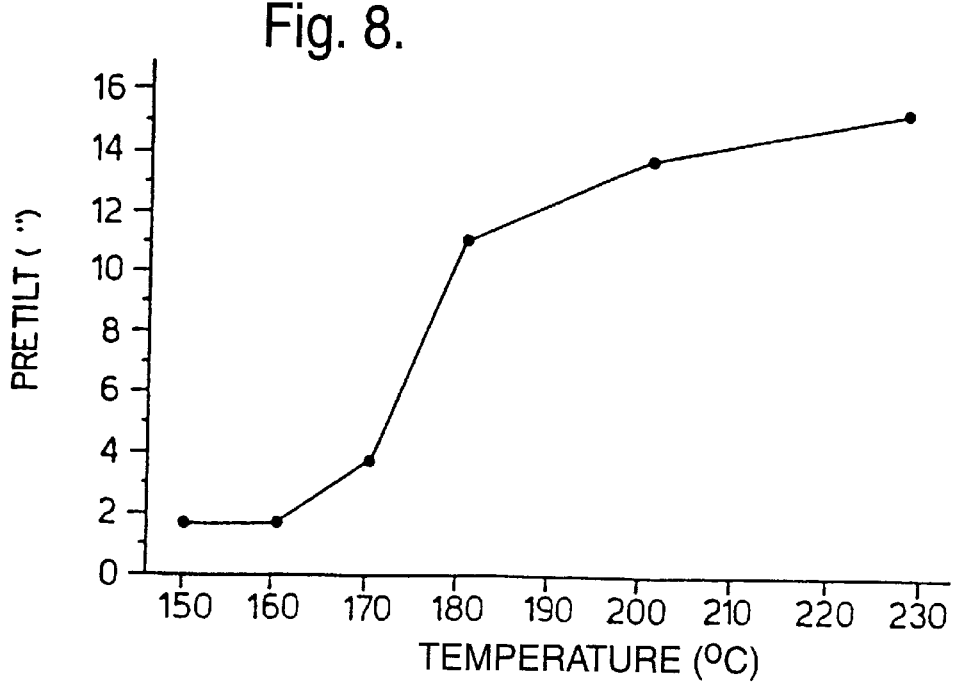
FIG. 8 is a graph showing surface pretilt against exposure time (and hence different grating profiles)

The grating produced by this method therefore has a varying cross section as shown in FIG. 7. This leads to a locally varying pretilt and hence a lower overall pretilt. Such grating were hardbaked and constructed as 10 $\mu$m antiparallel pretilt cells. It was found that a surface exposed for 227 seconds induced a pretilt of 15.4° while those exposed for 200 seconds induces gave a pretilt of 13.8°. FIG. 8 shows a plot of pretilt verses exposure times.

The pretilt can now be varied across a range that is useful for TN, STN and ferroelectric applications. The maximum pretilt found with this configuration is less than that found using the two exposure method but does not suffer from the two distinct regimes shown in FIG. 5 due to the periodic variation in the asymmetry.

Such grating surfaces can be formed on glass or polymer substrates by the above method or by embossing (M. T. Gale et al, J. Appl. Photo. Eng., 4, 2, 41 (1978)), ruling (E. G. Loewen and R. S. Wiley, Proc. SPIE 815, 88 (1987)) or interferography (M. C. Hutley, *Diffraction Gratings*, Academic Press London, pp. 95–125.

The grating surface can also be patterned so that it is restricted to the pixel area. In configurations such as a normally white twisted nematic, the unaligned interpixel gaps would then appear blank at all times dispensing with the need for an additional black matrix.

The grating within a pixel could also be divided into several areas with different alignment directions thus leading to improved viewing angles. Alternatively the grating properties can be varied to give a controlled variation in pretilt across the pixel allowing better greyscale capability. For example in the STN configuration, the voltage threshold is a function of the pretilt. See for example FIG. 9, and as described in T. Scheffer and J. Nehring, pp A-4/19, Seminar Notes, Eurodisplay 93, SID.

In FIG. 5, the director is assumed to be tangential to the local surface at all points. If the grating surface material is now made homeotropic then tilted homeotropic alignments can be achieved. This can be done by carrying out the following additional process steps. After grating development, the photoresist is treated with deep UV radiation (254 nm) to further polymerise the surface. The sample is then hardbaked at 180° C. for 30 minutes. The surface can now accept a homeotropic surfactant such as lecithin dissolved in isopropanol. By varying the grating profile pretilts between 60° and 90° may be obtained. Such alignment can be used for ECB (electrically controllable birefringence) which uses a negative $\Delta\epsilon$ material and relies on switching from the homeotropic to a planar configuration. Pretilt from the homeotropic is required to avoid reverse tilt disclinations. A grating surface fulfilling this requirement may lead to a higher contrast than conventional devices which use rubbed lecithin. The tilted homeotropic grating could also be used as a surface to accompany the bistable surface in a grating aligned bistable nematic as described in GB-9402513.

Figure 9:
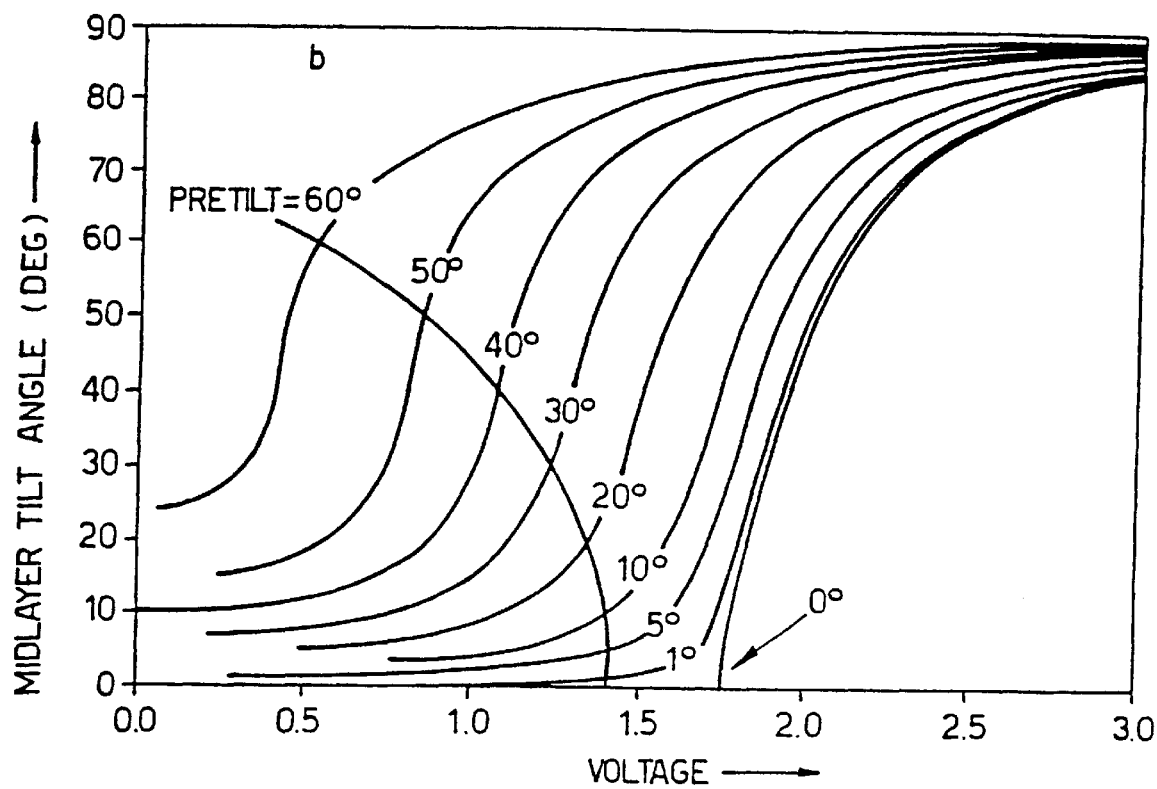
FIG. 9 is a graph showing midlayer director tilt against applied voltage for different surface pretilts.
Figure 10:
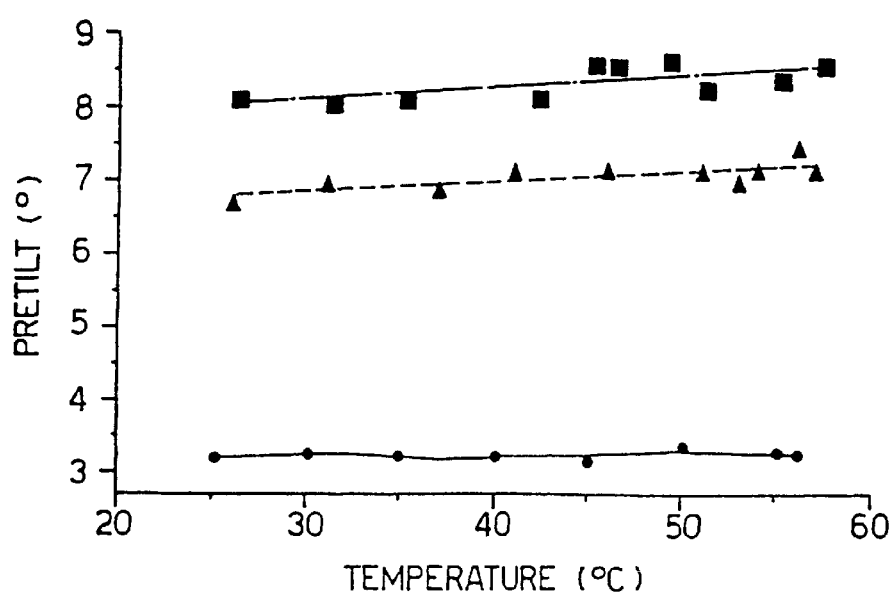
FIG. 10 is a graph of surface pretilt against temperature for three similar cells each filled with the same liquid crystal material.

One additional feature of this alignment method is that the pretilt has only a small temperature dependence. FIG. 9 shows the measured pretilt of three cells as a function of temperature (each cell was filled with E7). The liquid crystal material layer thickness was about 10 $\mu$m in all cells; only the grating was slightly different between cells, to give slightly different pretilts. In each case only a small rise is observed across the entire nematic range. This trend is the opposite of that observed for rubbed polymer alignment where pretilt usually falls with temperature due to a decreasing surface order parameter. In devices this decrease is problematic and leads to performance degradation at high temperature (reverse tilt disclinations in TNs and stripes in STNs). Therefore the trend observed for grating alignment is certainly preferable and may even allow a small amount of temperature compensation of other effects (threshold voltage, switching speed etc.). The small temperature dependence of pretilt for grating alignment suggests that it is independent of elastic constant ratios.

This was confirmed by making two further and identical cells, and filling them with different materials. The cell filled with E7 ($k_{33}/k_{11}$=1.54) possessed a pretilt of 15.6° while the cell filled with E170 ($k_{33}/k_{11}$=1.01) possessed a pretilt of 16.3° which is almost within experimental error. This material independence of pretilt is a further advantage of grating alignment.

We claim:

1. A liquid crystal device comprising:

two cell walls spaced apart and enclosing a layer of a liquid crystal material;

electrode structures on both cell walls;

a surface alignment (R) on the cell walls providing alignment of the liquid crystal material;

wherein at least one cell wall is provided with a bigrating;

the bigrating comprising an asymmetric modulated grating and a symmetric modulated grating arranged at a non-zero angle to one another with the two gratings having different groove depth or pitch values to provide alignment and surface pretilt to the liquid crystal material wherein the asymmetric grating has an asymmetry that varies along its length providing a locally varying pretilt.

2. The device of claim 1 wherein the two gratings are substantially orthogonal to one another.

3. The device of claim 1 wherein the asymmetric grating has a smaller groove depth and/or a longer pitch than the symmetric grating.

4. The device of claim 1 wherein the asymmetric grating has a longer pitch than the symmetric grating.

5. The device of claim 1 wherein the gratings are arranged across substantially the whole of a display area of the cell.

6. The device of claim 1 wherein gratings are applied to both cell walls and are of the same or different shape on each wall.

7. The device of claim 1 wherein the cell walls are of substantially rigid material.

8. The device of claim 1 wherein the cell walls are of a flexible material.

9. The device of claim 1 wherein the gratings are formed of a photoresist material.

10. The device of claim 1 wherein the gratings are formed of a plastics material.

11. The device of claim 1 wherein the gratings are formed of an embossed plastics material.

12. The device of claim 1 wherein the liquid crystal material is a nematic material.

13. The device of claim 1 wherein the liquid crystal material is a cholesteric material having a long pitch.

14. The device of claim 1 wherein the liquid crystal material is a ferroelectric material.

15. The device of claim 1 wherein the liquid crystal material has a positive dielectric anisotropy.

16. The device of claim 1 wherein the liquid crystal material has a negative dielectric anisotropy.

17. The device of claim 1 wherein the electrodes are formed as a series of row and column electrodes arranged in an x, y matrix of addressable elements or display pixels.

18. A liquid crystal device comprising:

two cell walls spaced apart and enclosing a layer of a liquid crystal material;

electrode structures on both cell walls;

a surface alignment (R) on the cell walls providing alignment of the liquid crystal material;

wherein at least one cell wall is provided with a bigrating that provides surface alignment with pretilt;

the bigrating comprising an asymmetric modulated grating and a symmetric modulated grating arranged at a non-zero angle to one another with the two gratings having different groove depth or pitch values and the asymmetric grating having an asymmetry that varies along its length to provide alignment and surface pretilt to the liquid crystal material wherein the gratings are arranged substantially at display pixel areas only.

19. A liquid crystal device comprising:

two cell walls spaced apart and enclosing a layer of a liquid crystal material;

electrode structures on both cell walls;

a surface alignment (R) on the cell walls providing alignment of the liquid crystal material;

wherein at least one cell wall is provided with a bigrating that provides surface alignment with pretilt;

the bigrating comprising an asymmetric modulated grating and a symmetric modulated grating arranged at a non-zero angle to one another with the two gratings having different groove depth or pitch values and the asymmetric grating having an asymmetry that varies along its length to provide alignment and surface pretilt to the liquid crystal material wherein the shape of the two gratings at each pixel varies within each pixel area, or between adjacent pixels.

20. A liquid crystal device comprising:

two cell walls spaced apart and enclosing a layer of a liquid crystal material;

electrode structures on both cell walls;

a surface alignment (R) on the cell walls providing alignment of the liquid crystal material;

wherein at least one cell wall is provided with a bigrating that provides surface alignment with pretilt;

the bigrating comprising an asymmetric modulated grating and a symmetric modulated grating arranged at a non-zero angle to one another with the two gratings having different groove depth or pitch values and the asymmetric grating having an asymmetry that varies along its length to provide alignment and surface pretilt to the liquid crystal material wherein directions of the gratings varies within each pixel area or between adjacent pixels.

21. A liquid crystal device comprising:

two cell walls spaced apart and enclosing a layer of a liquid crystal material;

electrode structures on both cell walls;

a surface alignment (R) on the cell walls providing alignment of the liquid crystal material;

wherein at least one cell wall is provided with a bigrating that provides surface alignment with pretilt;

the bigrating comprising an asymmetric modulated grating and a symmetric modulated grating arranged at a non-zero angle to one another with the two gratings having different groove depth or pitch values and the asymmetric grating having an asymmetry that varies along its length to provide alignment and surface pretilt to the liquid crystal material wherein one or both cell walls are coated with a surface surfactant over at least part of the wall.

* * * * *